United States Patent
Sakagami et al.

(10) Patent No.: US 7,693,514 B2
(45) Date of Patent: Apr. 6, 2010

(54) INFORMATION GATHERING ROBOT (75) Inventors: Yoshiaki Sakagami, Wako (JP); Yoko Saito, Wako (JP); Koji Kawabe, Wako (JP); Takamichi Shimada, Wako (JP); Nobuo Higaki, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1594 days.

(21) Appl. No.: 10/915,535

(22) Filed: Aug. 11, 2004

(65) Prior Publication Data
US 2005/0054332 A1 Mar. 10, 2005

(30) Foreign Application Priority Data

Aug. 18, 2003 (JP) ............................... 2003-294433
Aug. 18, 2003 (JP) ............................... 2003-294436

(51) Int. Cl.
H04Q 7/20 (2006.01)
(52) U.S. Cl. .................... 455/420; 455/414.2; 455/419; 455/456.6
(58) Field of Classification Search ............. 455/414.1, 455/457, 3.05, 3.06, 3.03, 414.4, 418, 420, 455/419, 456.1, 456.3, 456.6, 515, 517, 556.2, 455/556.1, 414.2; 700/259, 245, 258, 246, 700/247; 382/103, 153
See application file for complete search history.

(56) References Cited

U.S. PATENT DOCUMENTS

2003/0182117 A1* 9/2003 Monchi et al. .............. 704/237
2003/0216834 A1* 11/2003 Allard ........................ 700/245
2004/0013295 A1* 1/2004 Sabe et al. .................. 382/153
2004/0138547 A1* 7/2004 Wang et al. ................. 600/407
2005/0159841 A1* 7/2005 Yasukawa et al. ........... 700/245

FOREIGN PATENT DOCUMENTS

| JP | 08-318052 | 12/1996 |
| JP | 08-318053 | 12/1996 |
| JP | 10-293792 | 11/1998 |
| JP | 2001-320460 | 11/2001 |
| JP | 2002-006784 | 1/2002 |
| JP | 2003-006532 | 1/2003 |
| JP | 2003-137193 | 5/2003 |
| KR | 2000-36419 | 7/2000 |

OTHER PUBLICATIONS

Partial English translation of relevant portion of Japanese Office Action dated Jun. 26, 2007.

* cited by examiner

Primary Examiner—John Lee
(74) Attorney, Agent, or Firm—Squire, Sanders & Dempsey L.L.P.

(57) ABSTRACT

In an event site or the like, a visitor may waste time and effort trying to find a spot where an event of interest may be taking place because the visitor is unable to look through the entire site from any particular spot. An information gathering robot roams in such an event site typically along a prescribed route, and notes spots of interest to transmit this information to a data server. The visitor can access the data server to find a spot of interest of his or her choice substantially on a real time basis.

8 Claims, 7 Drawing Sheets

INFORMATION GATHERING ROBOT

TECHNICAL FIELD

The present invention relates to a robot for gathering information.

BACKGROUND OF THE INVENTION

In an event site where a large number of people congregate, such as a theme park, fair ground, bazaar, exposition, shopping mall and restaurant court, it is not possible to determine the state of congestion of a particular spot in the site unless the visitor actually walks to the particular spot. Therefore, it often happens that the visitor takes a trip to a particular spot and finds the spot too congested for the visitor to enjoy the spot. The visitor is thus forced to take unnecessary trips and waste time in an effort to find a spot of his or her choice.

Street performances are often shown in designated areas in a fair ground or in a street from which automobiles are blocked off. Various street performers show their performances irregularly and in various spots within the designated areas. Such a ground or event site is typically not designed so as to allow a general view of the site, and it is not possible for a visitor to find if any particular performance will suit the visitor's liking or not until the visitor actually comes to the spot. For this reason, each visitor has to take a tour of the entire site before he or she is capable of deciding which performance to see so that much time and effort has to be wasted.

The recent advance in technology allows images to be transmitted to remote locations by using the Internet and mobile phones (see Japanese patent laid open publication No. 2001-320460, for instance). If such a technology is used, a user can be informed on the state of a certain remote location without actually traveling to this location so that the user is not required to aimlessly move about and waste time and effort. Also, because the visitors can move with definite aims in most part, the distribution of the people within the site can be favorably averaged, and congestions in localized areas can be avoided.

BRIEF SUMMARY OF THE INVENTION

In view of such problems of the prior art and a recognition by the inventors, a primary object of the present invention is to provide a system that allows a visitor to an event site to find a spot that is likely to be attractive to the visitor without wasting time and effort even when the site does not allow the visitor to have a general view of the entire site from any particular point.

A second object of the present invention is to provide a system that allows a visitor to an event site to be informed of the states of various remote spots without requiring the visitor to actually traveling to such spots.

A third object of the present invention is to provide a system that allows visitors to an event site to move about with definite aims so that the visitors are not required to aimlessly move about and localized congestions can be avoided.

According to the present invention, at least part of such objects can be accomplished by providing an information gathering robot, comprising: traveling means for enabling the robot to move about within a prescribed area; information acquiring means for acquiring sound information and/or image information; and wireless communication means for transmitting acquired information to a data server.

According to a preferred embodiment of the present invention, the information acquiring means comprises a camera for acquiring image information, means for identifying human faces from the acquired image information, means for cutting out an image of each identified human face, and means for acquiring congestion information of a relevant spot by counting the number of the human faces that have been cut out.

Thereby, specific information on the state such as the degree of congestion or the number of the people in the waiting line for each spot along with the associated image information can be transmitted substantially on a real time basis so that each user can be kept informed of the state of the particular spot which the user is interested in. The transmitted information can be delivered to mobile phones equipped with a display and personal computers in the form of image information and speech information, each user can obtain information which the user wants not only promptly but also in a readily understandable manner. Therefore, each visitor is enabled to find a spot of his or her choice without wasting time and effort even when the site does not allow the visitor to have a general view of the entire site from any particular point.

The information acquiring means may include a microphone and be adapted to have an interview with a person walking away from the relevant spot. The robot travels along a prescribed route under normal condition, but when a request for specific information is made from a user, may also follow an improvised route that is suited for gathering the requested specific information.

According to another embodiment of the present invention, the information acquiring means includes a microphone and means for detecting sound having a prescribed feature that may represent a stirring or applause of a number of people in response to a performance shown to them. When such a sound feature is detected, the robot may take pictures of the surrounding scenes.

According to such an embodiment of the present invention, the robot can search for an attractive spot from a sound feature that represents the stirring and applause of a number of people, and transmit the pictures of such a spot so that specific information on such a spot can be transmitted substantially on a real time basis. Because the transmitted information can be obtained as image information and/or sound information from a mobile phone or personal computer, each user can gain access to such information in a readily understandable manner and substantially without any time delay. Therefore, not only each visitor is enabled to find a spot of his or her choice without wasting time and effort even when the site does not allow the visitor to have a general view of the entire site from any particular point but also localized congestion can be avoided because the visitors are prevented from aimlessly walking about within the site. The information acquiring means may be adapted to have an interview with a person walking away from the relevant spot to gain more specific information about each performance that is detected.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
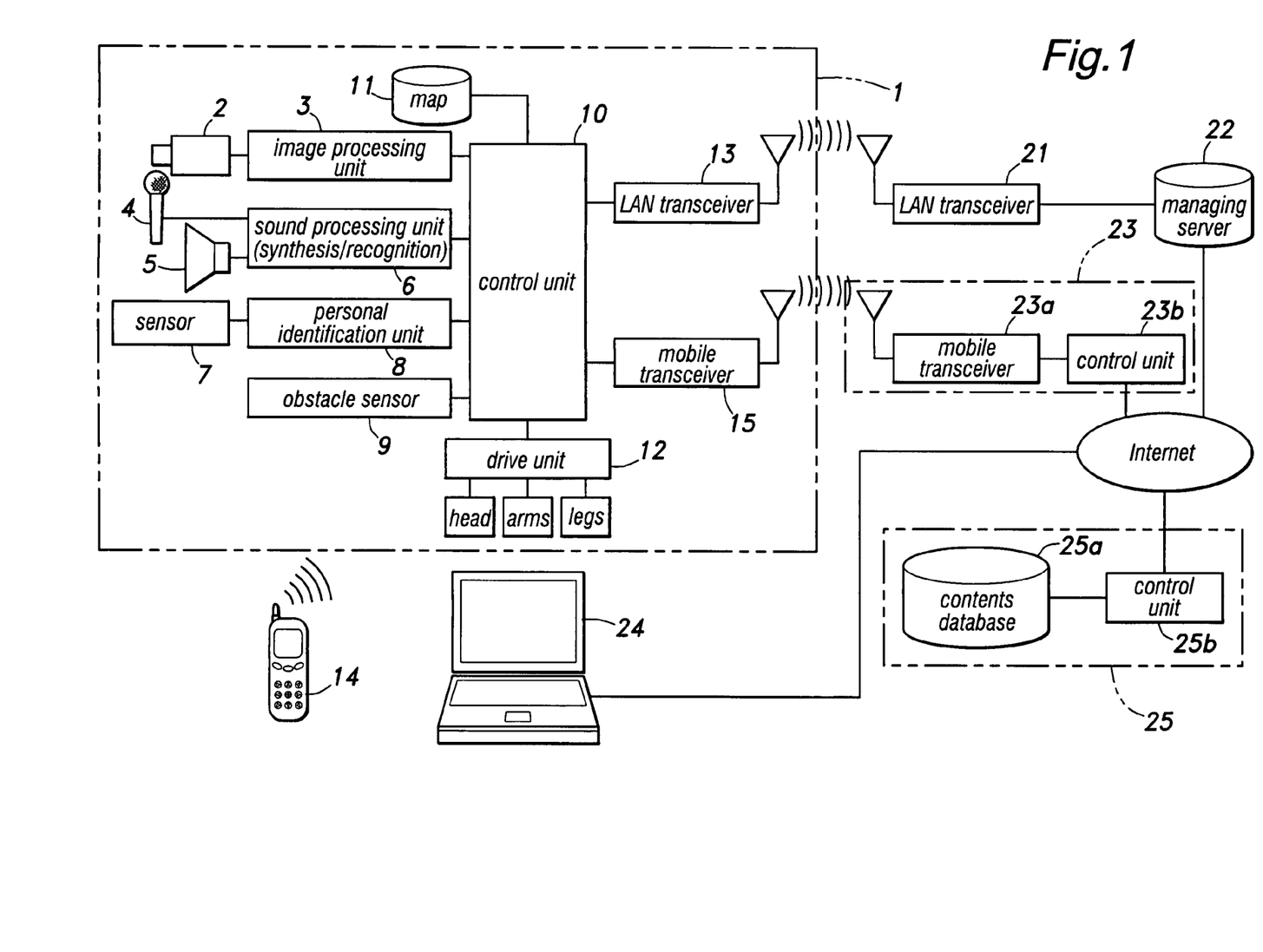
FIG. 1 is an overall block diagram of the information distributing system according to the present invention which is essentially implemented in the form of an information gathering robot.

FIG. 1 is an overall block diagram of an information delivery system in an information gathering robot embodying the present invention. The information gather robot 1 comprises a pair of cameras 2 arranged in a laterally spaced relationship as a means for capturing an image, an image processing unit 3 connected to the cameras 2, a pair of microphones 4 arranged in a laterally spaced relationship as a means for capturing sound, a sound processing unit 6 connected to the microphones 4, an individual detection sensor 7, an personal identification unit 8 connected to the individual detection sensor 7, an obstacle sensor 9, a control unit 10 receiving signals from the image processing unit 3, sound processing unit 6, personal identification unit 8 and obstacle sensor 9, a map database unit 11 connected to the control unit 10, a drive unit 12 connected to the control unit 10 for controlling the movement of the head, arms and legs of the robot, a LAN transceiver 13 for wireless LAN communication and a mobile transceiver 15 for communication with a mobile phone 14 carried by each individual user.

The image processing unit 3 determines the distance to a part of the captured image containing a largest number of edge points that are in motion by stereoscopic view, and defines a region for searching moving objects within the field of view of the cameras 2. The image processing unit 3 then searches for moving objects (humans) in this region by using a suitable known method such as the pattern matching method.

A moving object (human) can be extracted from the image information by using any one of a number of available methods. Such method include the method of dividing the region based on the clustering of the characteristic quantities of pixels, outline extracting method based on the connecting of detected edges, and dynamic outline model method (snakes) based on the deformation of a closed curve so as to minimize a pre-defined energy. For instance, an outline is extracted from the difference in brightness between the object and background, and a center of gravity of the moving object is computed from the positions of the points on or inside the extracted outline of the moving object. Thereby, the direction (angle) of the moving object with respect to the reference line extending straight ahead from the robot can be obtained. The distance to the moving object is then computed once again from the distance information of each pixel of the moving object whose outline has been extracted, and the position of the moving object in the actual space is determined.

An outline of the moving object detected within the viewing angle is extracted, and the uppermost position of the outline within the field of view is determined as the top of the head of the detected human. An area of a face is determined according to a typical size of a human face using the top of the head as a reference point. Color information is extracted from the face area, and this area is finally determined as a face when a human skin color is detected from this area.

Based on the size of the face area, the outline of the human within the viewing angle can be determined, and cut out for the subsequent processing. If there are a plurality of humans within the viewing angle, this process may be repeated for the same number of times as the number of the humans within the viewing angle.

The sound processing unit 6 receives the sound signals from the two microphones 4, and determines the location of the sound source from the differences in the sound pressures and arrival times between the right and left microphones 4. Additionally, the sound processing unit 6 identifies the kind of sound such as cheers and handclapping from the rise properties and spectral properties of the sound, and recognizes speech according to a vocabulary which is registered in advance. If required, the robot may move toward the source of the sound, and take pictures of the surrounding area.

By looking up map data stored in the map database unit 11, it is possible to identify the current position, a predetermined tour route and areas for taking pictures. Thereby, the robot is able to know if it has not moved out of the area covered by the wireless LAN communication.

A plurality of wireless LAN communication transceivers 21 are placed in strategic points within the roaming area of the information gathering robot 1 for communication with the robot 1, and are connected to a managing server 22.

A plurality of portable terminal base stations 23 are placed in strategic points within the roaming area of the information gathering robot 1 to enable communication between the portable terminal carried by each user and the mobile transceiver 15 equipped to the information gathering robot 1. Each portable terminal base station 23 comprises a transceiver 23a which is linked to the transceivers 23a of other base stations 23 and a control unit 23b which is linked to the Internet to allow access from a personal computer 24.

A data server 25 is provided separately from the managing server 22, and includes a contents database unit 25a and a control unit 25b that are connected to each other. The control unit 25b of the data server 25 is also connected to the Internet.

Figure 2:
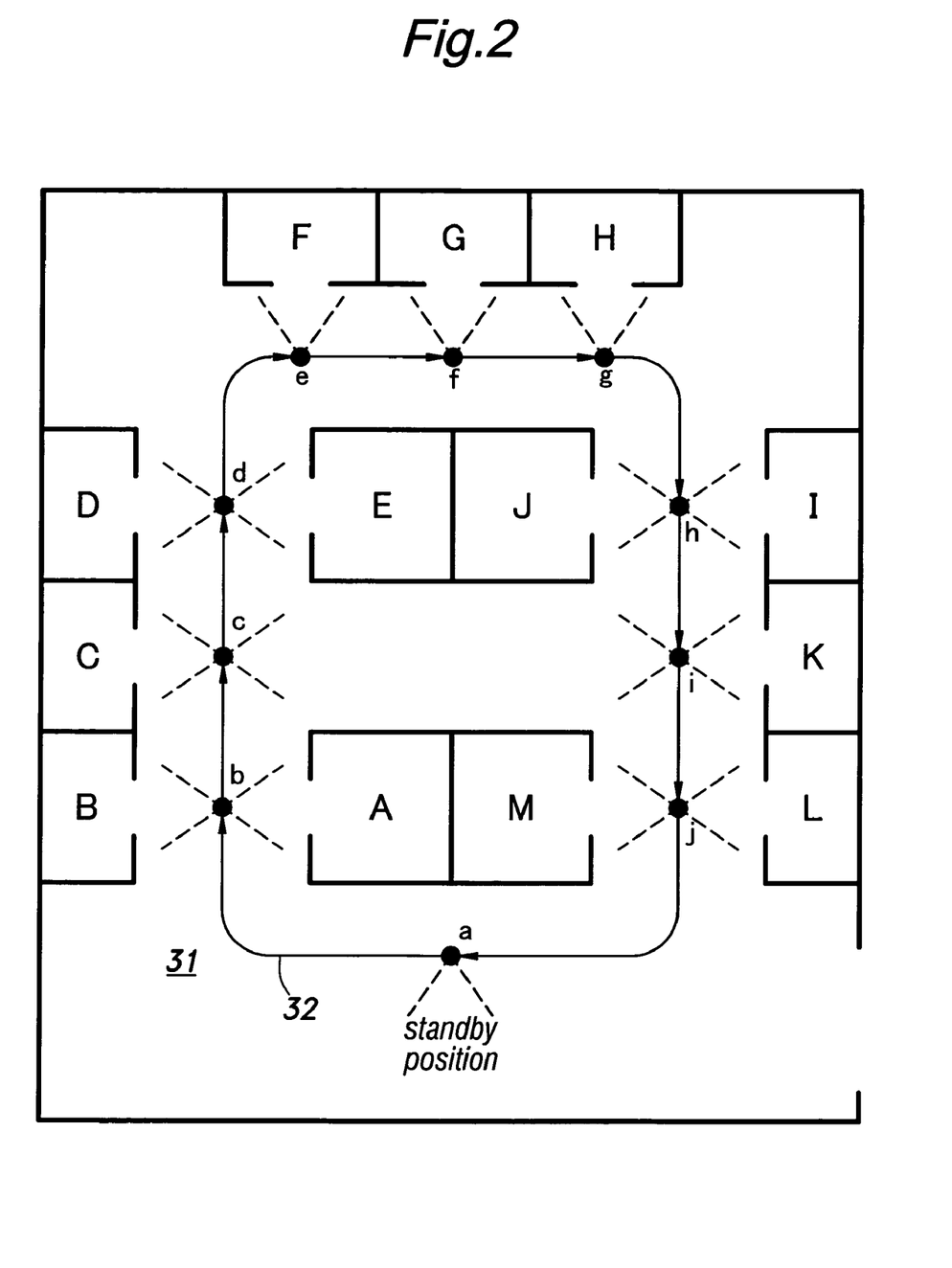
FIG. 2 is a flow diagram showing the control flow of the first embodiment of the present invention.

FIG. 2 shows the layout of booths in an event site given as an example of the roaming area of the information gathering robot 1. The event site includes a plurality of booths A to M and a corridor 31 to which the entrance to each booth A to M faces. The information gathering activity of the robot 1 is described in the following with reference to FIG. 3.

Figure 3:
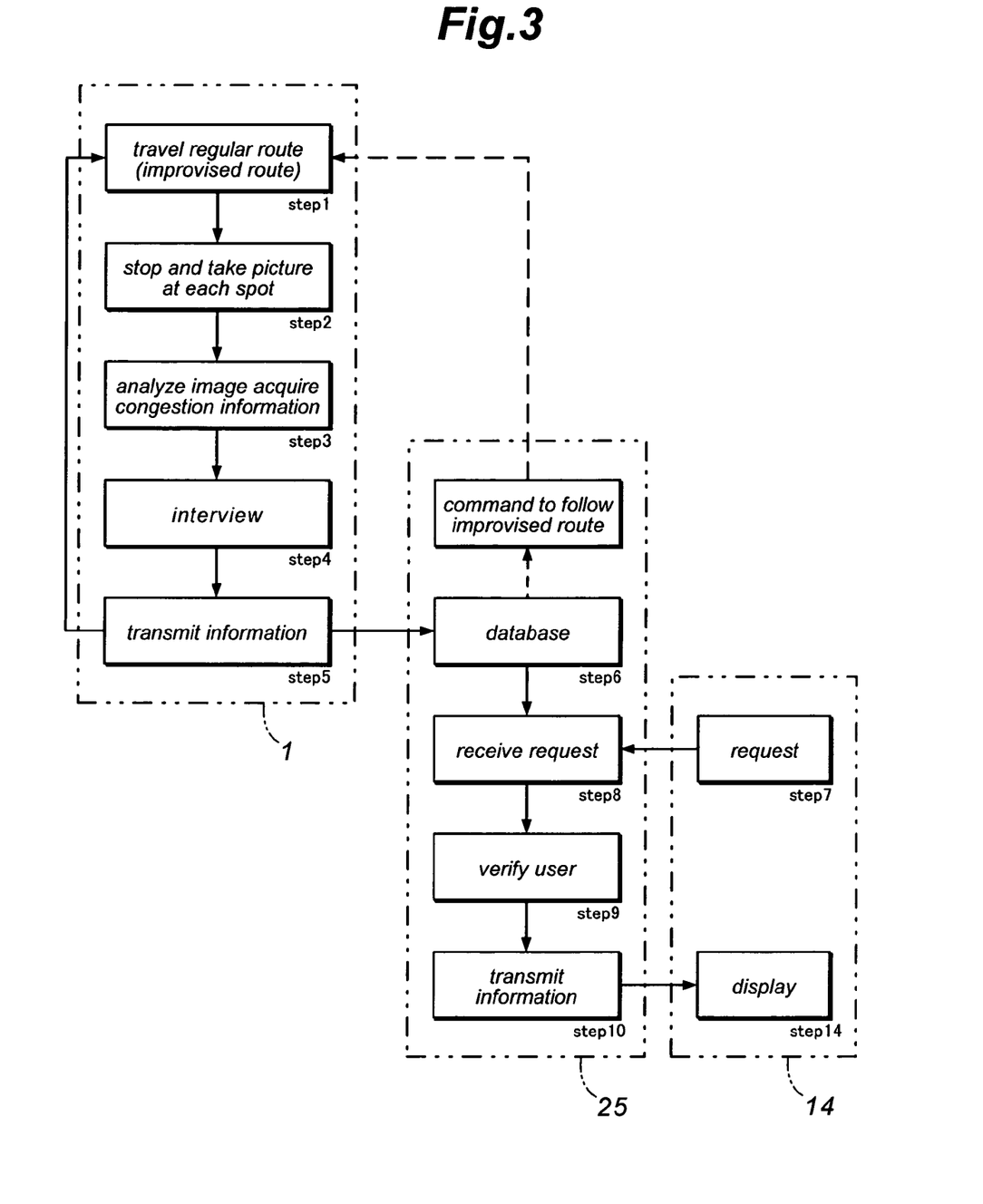
FIG. 3 is a layout view of an event site to which the present invention may be applied.

The information gathering robot 1 starts from a standby position a, and regularly moves along a looped route 32 (step 1). The robot 1 stops at each of a prescribed spots b to j for picture taking along the route 32, and takes pictures of the areas around the entrance of each booth A to M (step 2).

The image data obtained at the picture taking spots b to j is instantly analyzed by the image processing unit 3, and the number of people waiting at the entrance, length of the queue and expected waiting time at each booth is computed by the control unit 10 so that the robot 1 acquires information on the degree of congestion of each booth (step 3). If any person walking out of a nearest booth is detected, the robot speaks to this person, and interviews him or asks him the impression of this particular booth (step 4).

The information on the degree of congestion and speech information of the interview is successively forwarded to the managing server 22 via the communication LAN transceivers 13 and 21 along with the time stamp for the time of information acquisition or image acquisition (step 5).

The various pieces of information received by the managing server 22 is sequentially stored and updated in the data server 25 provided with an Internet connection (step 6).

The user who wishes to receive information from the robot 1 registers the phone number of his or her portable telephone equipped with an image display or the IDE code of a portable terminal 14 which he or she has rented in the managing server 22 in advance, and transmits a request for information from this telephone or terminal (step 7).

Figure 4:
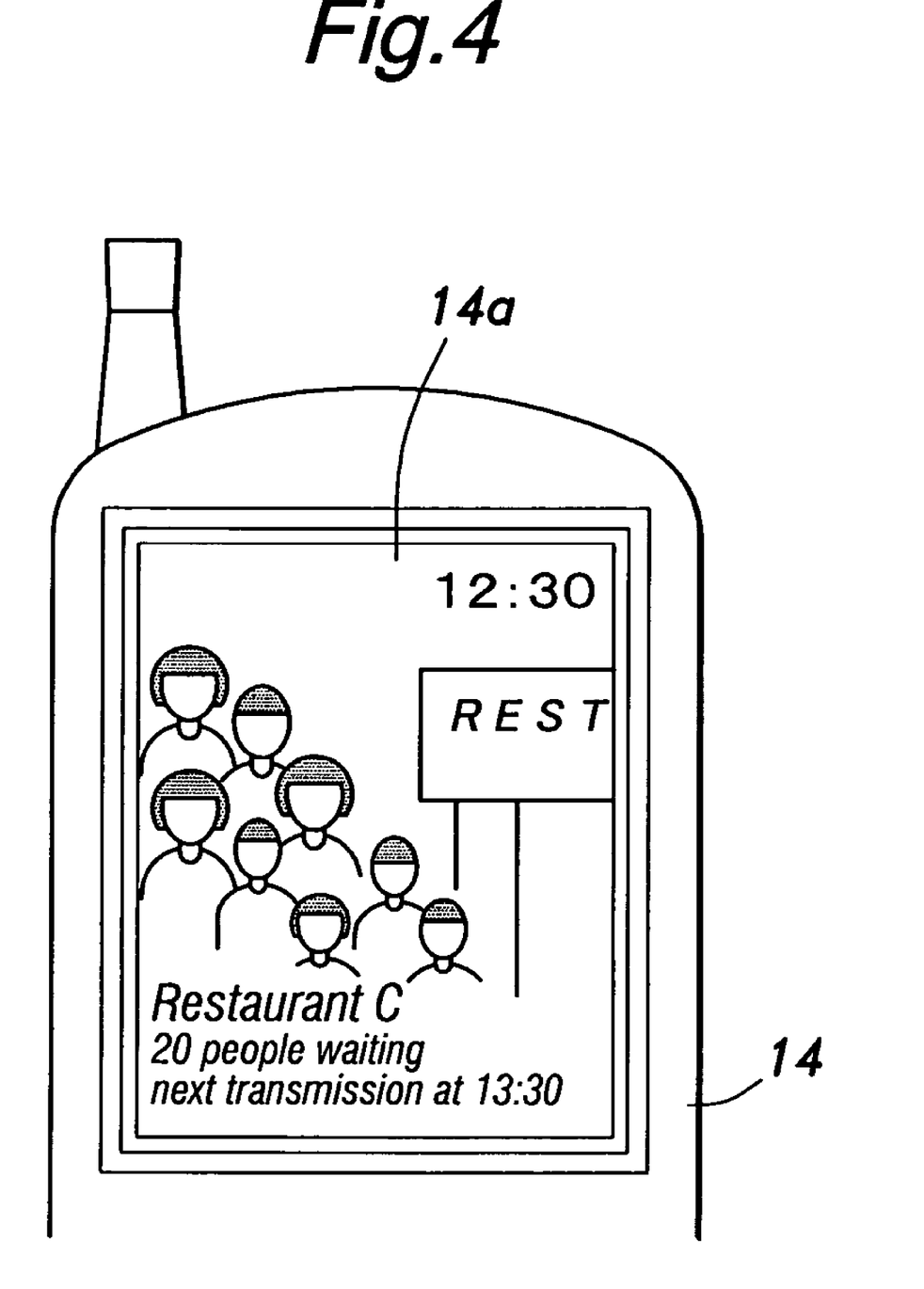
FIG. 4 is a view of a display screen of a mobile terminal according to the present invention.

Upon receipt of a request for information (step 8), the managing server 22 determines if the request has come from a registered user by matching a code attached to the request with the ID codes of the registered users (step 9). If the request has come from a registered user, updated information that suits the request of the user is selected, and transmitted to the terminal or mobile phone 14 of the corresponding user in the form of a brief comment in text including a time of information acquisition (step 10). This information may be displayed on the image display 14a of the mobile phone 14 carried by the user in such a manner as illustrated in FIG. 4 (step 11).

When it is determined that the user has indeed received the information, corresponding charging information is shown on the display of the terminal, and charges the user with his or her consent.

The information gathering robot 1 not only regularly travels along the prescribed route 32 but, when the robot has received a request for information acquisition, a new route may be improvised so as to meet the request. Thereby, the robot 1 is enabled to promptly provide the user with information that is requested.

The terminal for entering a request for information acquisition may include a desk top personal computer that may be placed at the entrance to the event site as well as a mobile phone, personal computer and rented portable terminal carried by each individual user.

The information gathering robot 1 preferably consists of a bipedal robot as such a robot is able to move about in a crowded place without obstructing the movement of the people, but may also take any other form depending on the particular size and layout of the event site. For instance, the robot may be adapted to move about by using wheels and crawler belts if desired.

In the foregoing embodiment, the information gathering robot can transmit specific information on the state of congestion of each specific spot within a prescribed area substantially on a real time basis. Therefore, the robot will be highly effective in not only distributing information in such places as theme parks, event sites and shopping malls but also colleting information in such forms as images of congregating people for the purposes of security and crime prevention.

Figure 5:
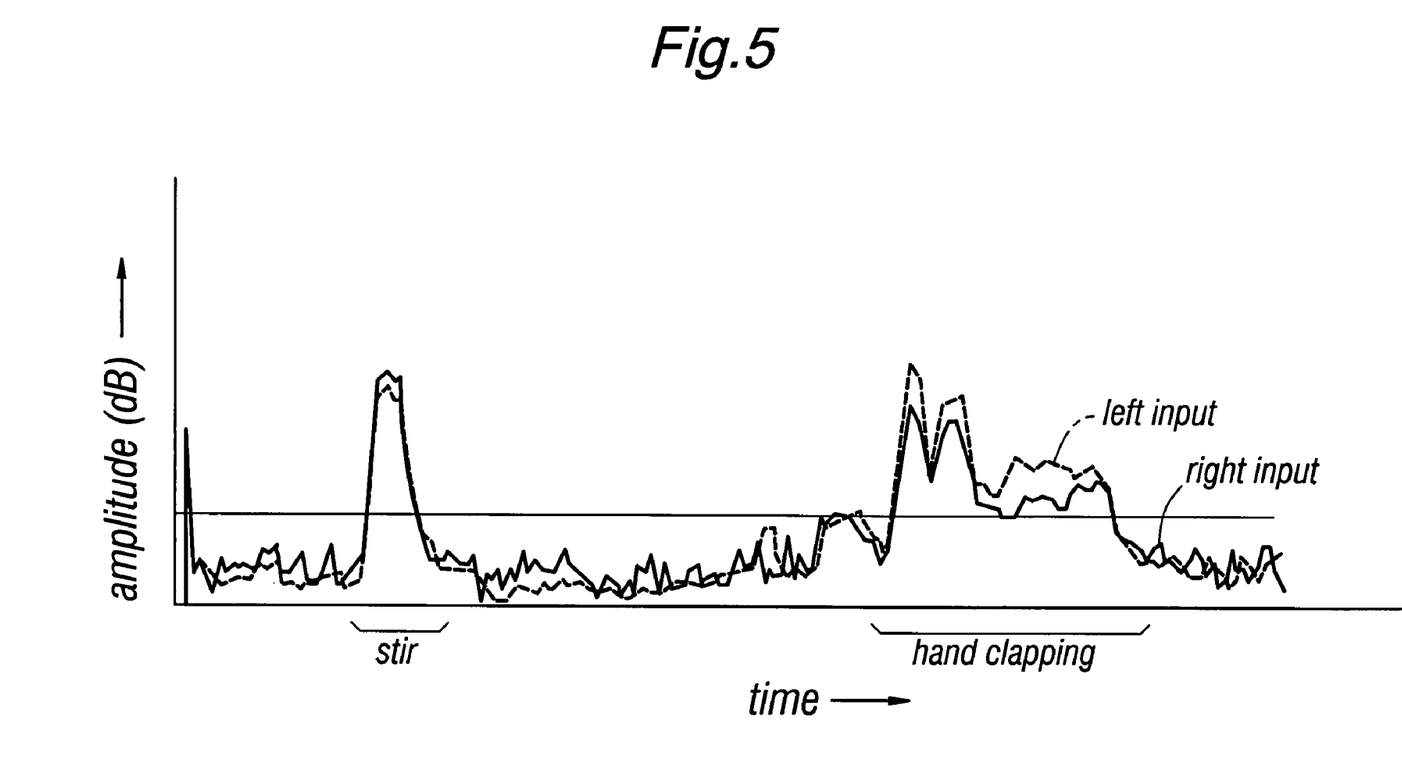
FIG. 5 is a graph showing exemplary sound features.
Figure 6:
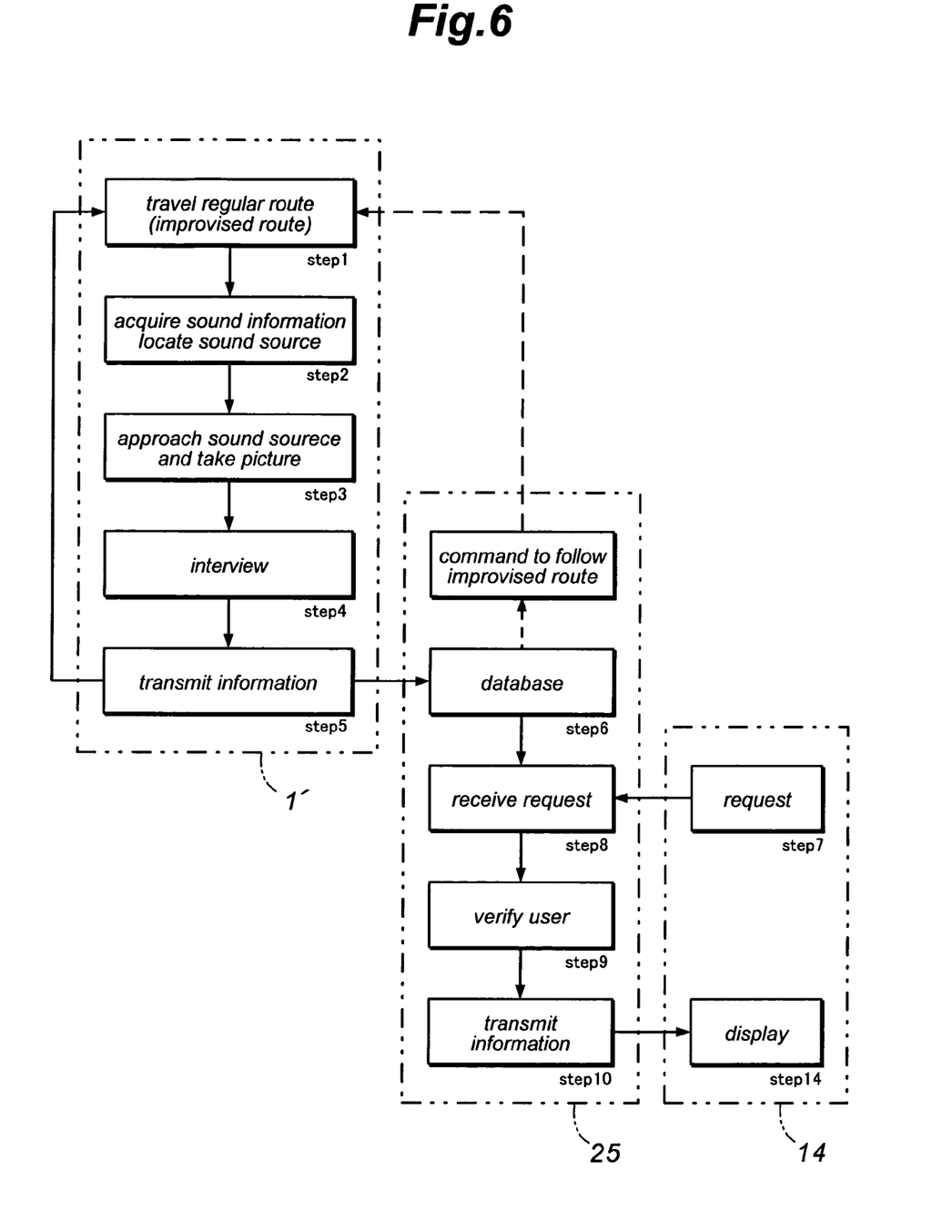
FIG. 6 is a flow diagram showing the control flow of the second embodiment of the present invention.
Figure 7:
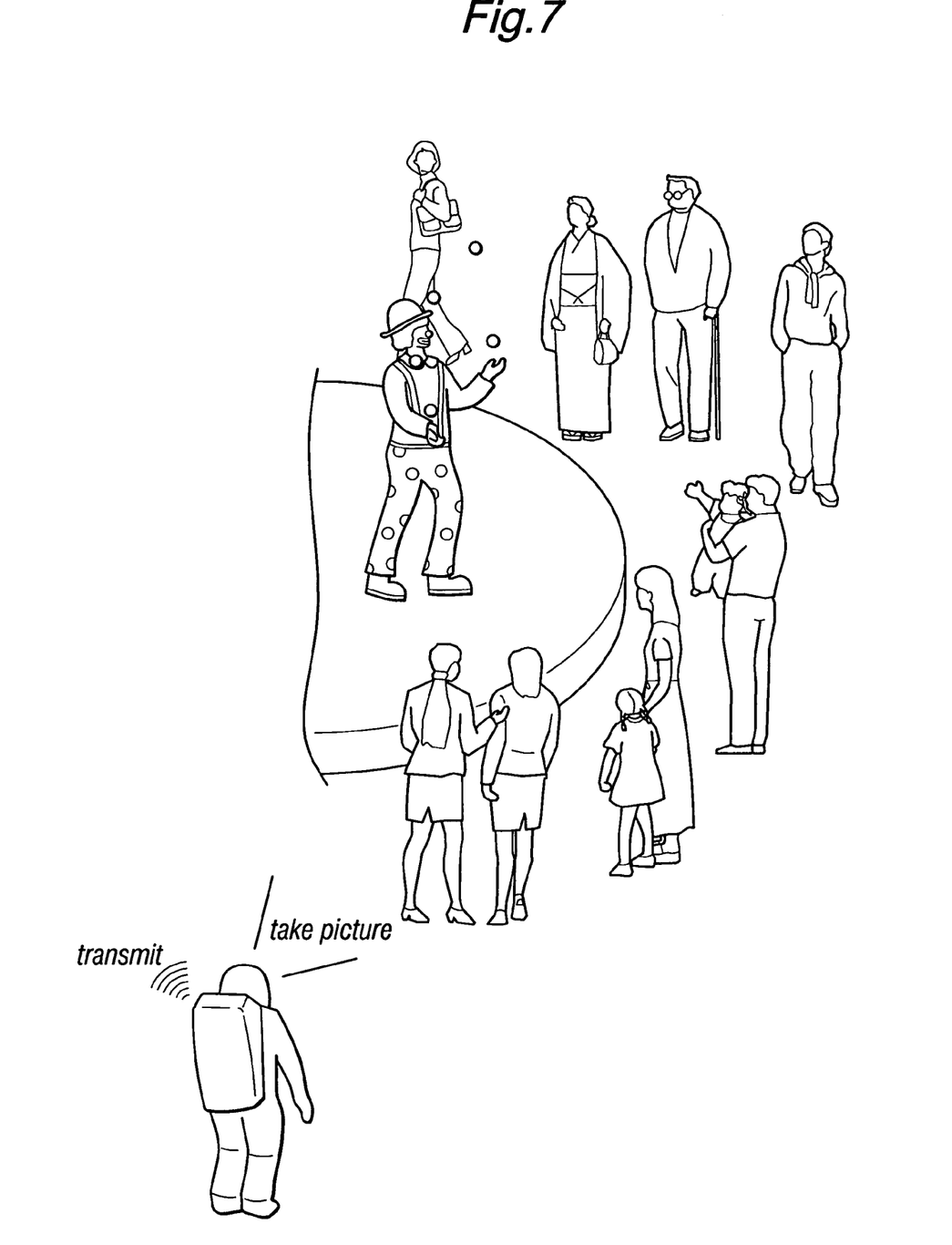
FIG. 7 is a perspective view of the information gather robot taking a picture of a spot of a potential interest.

FIGS. 5 to 7 show a second embodiment of the present invention which may be implemented jointly or alternatively with the first embodiment. The parts of the second embodiment that are identical or similar to those of the first embodiment are not described anew, and reference should be made to the description of the corresponding parts of the first embodiment.

The overall block diagram of the second embodiment is not different from that of the first embodiment. However, it should be noted that the sound processing unit 6 of the second embodiment is capable of detecting an event attracting the attention of a number of people from certain characteristic features of the acquired sound. FIG. 5 shows such a pattern of sound. For instance, cheers and stirs of an audience may be characterized by sharp rises of sound and long durations of a relatively high level of sound volume, and hand clapping may be characterized a sound volume exceeding a certain threshold level lasting for more than a prescribed period of time.

The information gathering activity of the robot 1 is described in the following with reference to FIG. 6.

The information gathering robot 1 starts from a standby position a, and regularly moves along a looped route 32 (step 1). The robot 1 collects and analyzes sound information as it travels, and searches for a sound source demonstrating certain characteristic features (step 2).

The sound processing unit 6 instantly analyzes the acquired sound information. If any point of interest or any point where a number of people congregate and a sound feature representing a reaction of people to an attractive event is detected, the robot moves toward this point and extracts a group of people to take pictures of a central part thereof (step 3). If the robot has detected any person who is facing toward the robot, the robot speaks to this person and interviews him or her to hear his or her impression of the attractive event (step 4).

The image information of the area surrounding the sound source and speech information of the interview are successively transmitted to the managing server 22 via the communication LAN transceivers 13 and 21 along with the time stamp of the time of information acquisition or image acquisition. The process flow is otherwise similar to that of the first embodiment.

In the foregoing embodiment, the information gathering robot can search for a spot where an attractive performance is taking place, and can transmit specific information on the performance and/or the reaction of the audience substantially on a real time basis. Therefore, the robot will be highly effective in not only distributing information in such places as theme parks, event sites and shopping malls but also colleting information in such forms as images of congregating people for the purposes of security and crime prevention.

Although the present invention has been described in terms of preferred embodiments thereof, it is obvious to a person skilled in the art that various alterations and modifications are possible without departing from the scope of the present invention which is set forth in the appended claims.

The invention claimed is:

1. An information gathering robot, comprising:
   traveling means for enabling the robot to move about within a prescribed area in a predefined route;
   information acquiring means for acquiring information comprising at least one of sound information or image information at one or more predefined locations on said predefined route; and
   wireless communication means for transmitting acquired information to a data server,
   wherein the information acquiring means comprises a camera for acquiring image information, means for identifying human faces from the acquired image information, means for cutting out an image of each identified human face, and means for acquiring congestion information of a relevant spot by counting the number of the human faces that have been cut out.

2. An information gathering robot according to claim 1, wherein the information acquiring means includes a microphone and is configured to have an interview with a person walking away from the relevant spot.

3. An information gathering robot according to claim 1, wherein the robot is configured to travel along the predefined route under normal condition, but when a request for specific information is made from a user, to follow an improvised route that is suited for gathering the requested specific information.

4. An information gathering robot according to claim 1, wherein the information acquiring means includes a microphone and means for detecting sound having a prescribed feature.

5. An information gathering robot according to claim 4, wherein the information acquiring means is configured to have an interview with a person walking away from the relevant spot.

6. An information gathering robot according to claim 4, wherein the information acquiring means is additionally provided with a camera for taking a picture of a spot at which a prescribed feature is detected in the acquired sound information.

7. An information gathering robot, comprising:

traveling means for enabling the robot to move about within a prescribed area;

information acquiring means for acquiring sound information or image information;

and wireless communication means for transmitting acquired information to a data server, wherein the information acquiring means comprises a camera for acquiring image information, means for identifying human faces from the acquired image information, means for cutting out an image of each identified human face, and means for acquiring congestion information of a relevant spot by counting the number of the human faces that have been cut out.

8. An information gathering robot according to claim 7, wherein the information acquiring means includes a microphone and is adapted to have an interview with a person walking away from the relevant spot.

* * * * *